Jan. 17, 1950 P. G. SLETNER 2,494,589
ELECTRICAL HEATING BODY
Filed May 14, 1947 2 Sheets-Sheet 2
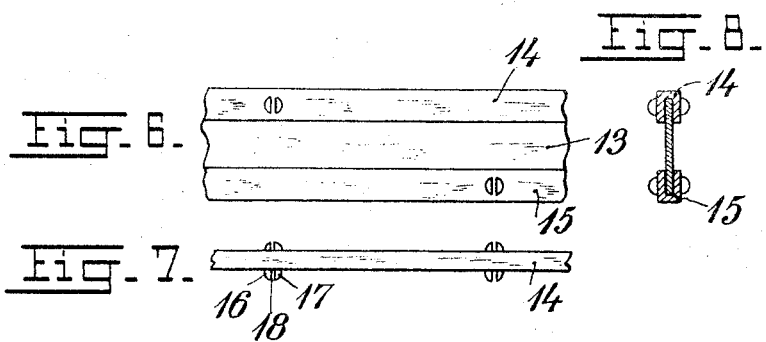
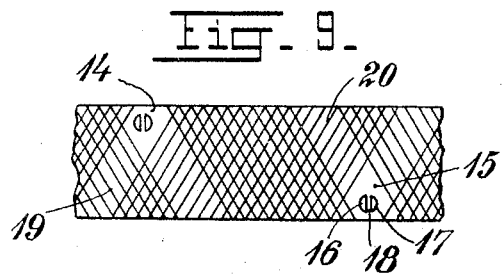
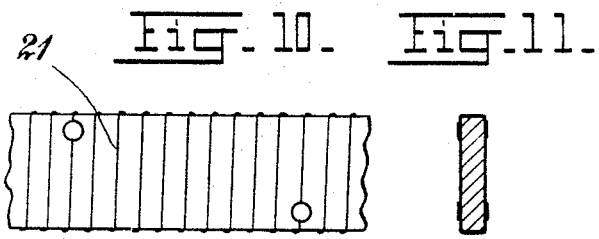
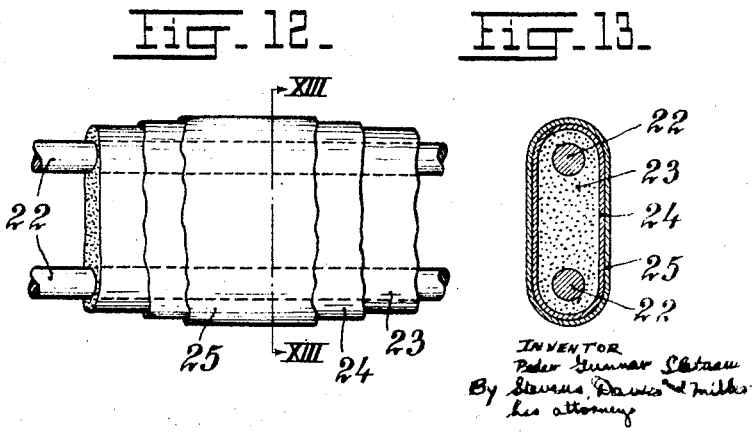

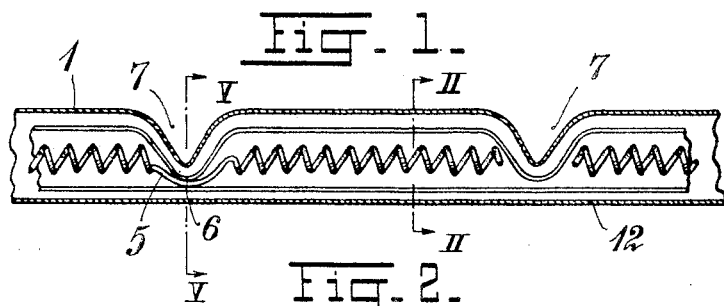
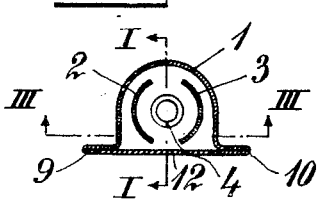
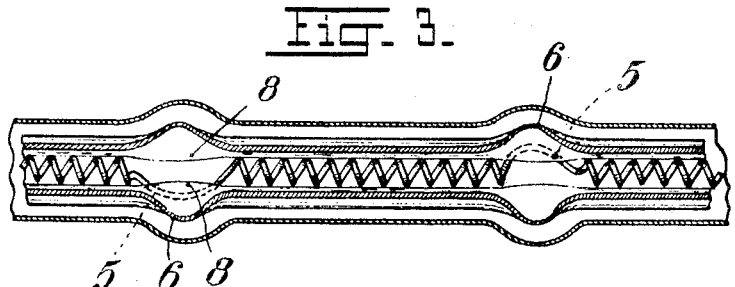
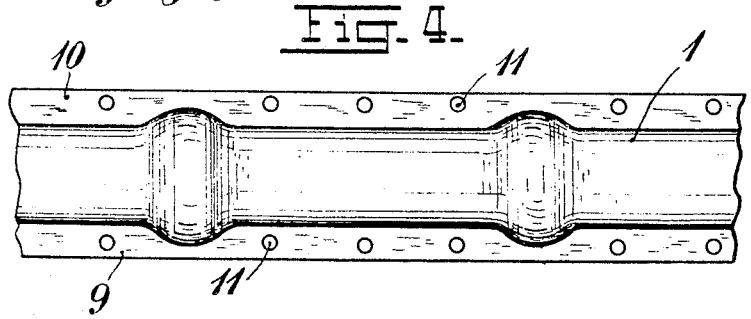
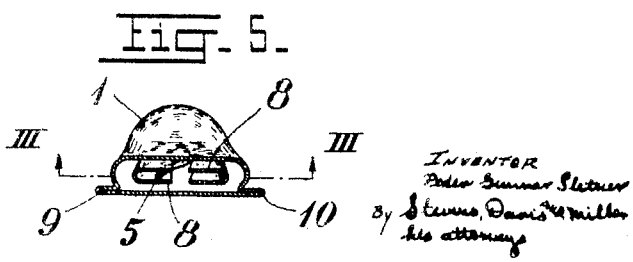

Patented Jan. 17, 1950

2,494,589

UNITED STATES PATENT OFFICE 2,494,589

ELECTRICAL HEATING BODY

Peder Gunnar Sletner, Oslo, Norway

Application May 14, 1947, Serial No. 747,883
In Norway September 16, 1940

Section 1, Public Law 690, August 8, 1946
Patent expires September 16, 1960

6 Claims. (Cl. 201—63)

1

The present invention relates to electrical heating bodies or structures of the type, in which are used two or more separate current conductors, which at certain intervals are interconnected by means of heating-wire or wires connected in parallel thereto, said current conductors being connected to terminals of different polarities.

The invention is essentially characterized by the feature, that said heating element is in the shape of a continuous body or cable of any desired length and preferably flexible. Such a heating body is in this description, for sake of simplicity, termed a cable or a heating cable.

The heating-member or members of said cable are electrically insulated in relation to the exterior part of the cable. According to a further feature of the invention the cable is filled, instead of with a material of common insulating type, with a material of the so-called semi-conducting type, which later material will form an innumerable number of parallel connections between said current conductors.

Electrical heating-bodies of the general type described above are previously known, but to the best of my belief it has never been suggested to manufacture the same in the shape of an elongated body or cable, which I now propose.

Such cables are extremely well adapted for room heating, drying purposes and the like, where the heat generated should be distributed as evenly as possible, and may also be used for purposes where higher temperatures are desired. The cable may easily be cut into lengths suitable for each purpose.

The accompanying drawings illustrate by way of example different embodiments of the invention.

Figure 1 is a vertical section of part of a cable on the line I—I of Figure 2.

Figure 2 is a cross section on the line II—II of Figure 1.

Figure 3 is a longitudinal section on the line III—III of Figure 5.

Figure 4 is a top plan view of the cable, and

Figure 5 is a cross section on the line V—V of Figure 1.

Figures 6-11 inclusive illustrate some manufacturing steps of another embodiment of a cable according to the invention.

Figure 12 is an external view of part of a third embodiment, portion of the several layers thereof being cut away, and Figure 13 is a section on the line XIII—XIII of Figure 12.

Referring to the embodiment illustrated in Figures 1-5 inclusive, the cable comprises two (or more) longitudinal current conductors 2 and 3, which may consist of flat copper strips or the like 2 and 3, enclosed within an outer protecting sheath 1, which may, for instance, consist of lead. Said strips are located one at each side of the central axis of the cable and are preferably curved in transverse direction, as shown in Figure 2. Said strips are adapted to be connected with terminals of a source of current, in such manner that the strips have always opposite polarities. Between said strips is located a longitudinal heating-wire 4, which may be helically wound, as shown. The outer sheath 1, the strips 2 and 3 and the heating-wire are electrically insulated from each other by a suitable refractory insulating material, which, however, is not indicated on the drawing.

At certain places 6 the heating-wire 4 is connected with strips 2 and 3 alternately, the heating-wire being at such places drawn out or extended to form a loop 5. Thus the portions of the heating-wire 4 situated between places 6 are connected in parallel. This means that no breaking of the current along the cable will occur even if the heating-wire 4 burns off at one or several points thereof, or if the connection between the heating-wire 4 and the strip at any point 6 should loosen.

In order that the cable shall be easily flexible it may, at intervals, be provided with transversely extending depressions 7, suitably arranged at those locations 6 where the heating-wire is connected with strip 2 or 3. As best shown in Figure 5 the strips are, at these locations, collapsed into contact with the loop 5 of the heating-wire, and the collapsed portions 8 of the strips secured to the heating-wire loop at those places, in a manner which does not need to be further described.

The outer sheath 1 of the cable suitably is formed with two longitudinal flanges 9 and 10 having holes 11 therein, for being fastened to a support by means of screws or the like. That surface 12 of the cable, which is to rest against such support, is preferably flat, and said flanges form part of such surface. However, if desired said flanges may be arranged in other ways, and their number may differ from two.

A more simple embodiment of the cable is shown in Figures 6-11 inclusive, which diagrammatically illustrate different stages of the manufacture thereof. According to Figures 6-8, which illustrate the central portion of the cable, shown in three different projections, the cable has a strip core 13 of insulating material. The two current conductors 14 and 15 are of U-shape and embrace the edges of the core. At each connection or coupling location said conductors or strips are, at each side thereof, provided with two contact projections or "beaks" 16 and 17, situated at such distance from each other that therebetween is formed a groove 18, in which the heating-wire is to be placed, in a manner described below.

As indicated in Figure 9 the core and the strips are insulated from each other, for instance by means of two layers of cotton threads 19 and 20 respectively, which are so wound on that the contact beaks 16 and 17 are not covered. Round the body thus formed is then wound, as shown in Figure 10, resistance wire 21 so closely wound, that a winding thereof will always enter the groove 18. After winding the beaks 16 and 17 are pressed or driven towards the strips, as shown in Figures 10 and 11. Hereby the beaks are flattened out and pressed firmly against the heating-wire, so that good contact is ensured therebetween.

After such placing of the resistance wire a new insulating layer is arranged thereon, and the body so formed is enclosed within a protecting sheath, say a lead sheath, in usual manner. Such outer insulating layer and protecting sheath are, however, not shown in Figures 6–11.

The heat cable described may, if desired, have more than one heating-wire, and the several parts thereof may be arranged in other manners than here shown.

A third embodiment of a cable according to the invention is illustrated in Figures 12 and 13. Here 22 are metallic current conductors, which extend in parallel through the cable and are adapted to be connected to the current source. If desired more than two current conductors may be used, thus three current conductors may be used if the cable is to be connected to a three-phase source of current. Within the space between such current conductors is placed a material 23 of the semi-conducting type, which also encloses the current conductors in such manner that good contact therebetween is obtained. Said semi-conductor is placed in the same manner as is the insulation in an usual cable. Enclosing the semi-conductor is an insulating layer 24, and the body so formed is enclosed within a sheath 25 of lead or the like.

As will be realized the semi-conductor 23 represents an innumerable number of parallel coupled connections between said current conductors, so that in every section of the cable a transversely directed current will flow in the semi-conductor. Due to this fact the heat generated in the semi-conductor will be evenly distributed along the entire cable. Moreover, the heat generated by the cable will be substantially proportional to the longitudinal extension of the cable.

If desired any current conductor may be subdivided into branches electrically coupled in parallel, which branches are spaced from each other and are surrounded by resistance material.

The material used for semi-conductor should have a conductivity corresponding to its use. It should be resilient throughout its mass, so that the cable will be flexible. Said material may also consist of a powder or of a plastic body. If desired the conductivity of the semi-conductor may be brought to a suitable value by a suitable mechanical and/or chemical treatment. As an example of a suitable semi-conducting material there may be mentioned a mixture of the plastic material known as Perbunan with metal powder.

A heating-element of the character described also may be constructed by arranging the heating-wire or heating-resistor in the form of continuous meanders or windings at one side or at both sides of a strip or a like body consisting of sufficiently heat resisting and electrically insulating material. This heating-wire is at spaced intervals connected to current conductors, bus-bars or the like, situated at the opposite side of the strip and within the latter respectively. Further, the heating-wire, and eventually also the bus-bars, may be woven onto or into the strip, which latter suitably may be woven from asbestos, cotton, paper or the like.

I claim:

1. An electric heating cable of indefinite continuous length, comprising at least two interspaced current conductors adapted to be connected to terminals of opposite polarities, and a number of heating resistors mutually coupled in parallel and interconnecting said conductors at predetermined intervals.

2. An electric heating cable of indefinite continuous length, comprising at least two interspaced current conductors adapted to be connected to terminals of opposite polarities, and a number of heating resistors mutually coupled in parallel and interconnecting said conductors at predetermined intervals, said conductors and heating resistors being mounted on an insulating core and insulated from each other except at predetermined interspaced points.

3. An electric heating cable of indefinite continuous length, comprising at least two interspaced current conductors adapted to be connected to terminals of opposite polarities, and a number of heating resistors mutually coupled in parallel and interconnecting said conductors at predetermined intervals, said conductors and heating resistors being mounted on an insulating core and insulated from each other except by predetermined interspaced contact members secured to the conductors and having a transverse groove for receiving the contact parts of the heating resistors, consisting of heating wire, when wound on the core.

4. An electric heating cable of indefinite continuous length, comprising at least two interspaced current conductors adapted to be connected to terminals of opposite polarities, and a number of heating resistors mutually coupled in parallel and interconnecting said conductors at predetermined intervals, said conductors and heating resistors being mounted on an insulating core and insulated from each other except at predetermined interspaced points, said resistors consisting of heating-wire woven on to or into said core, which may have the shape of a strip woven from asbestos, cotton, paper or the like.

5. An electric heating cable of indefinite continuous length, comprising at least two interspaced current conductors adapted to be connected to terminals of opposite polarities, and a number of heating resistors mutually coupled in parallel and interconnecting said conductors at predetermined intervals, said conductors and heating resistors being mounted on an insulating core and insulated from each other except at predetermined interspaced points, said resistors consisting of heating-wire woven on to or into said core, which may have the shape of a strip woven from asbestos, cotton, paper or the like, on to or into which also said conductors are woven.

6. An electric heating cable of indefinite continuous length, comprising at least two interspaced current conductors adapted to be connected to terminals of opposite polarities, and a number of heating resistors mutually coupled in parallel and interconnecting said conductors, said heating resistors being constituted by a semi-conducting material filling the space between said conductors.

PEDER GUNNAR SLETNER.

REFERENCES CITED

The following references are of record in the file of this patent:

UNITED STATES PATENTS

| Number | Name | Date |
|---|---|---|
| Re. 19,567 | Wiegand | May 7, 1935 |
| 1,857,615 | Backer | May 10, 1932 |
| 2,161,781 | Challet | June 13, 1939 |
| 2,175,893 | Hill | Oct. 10, 1939 |
| 2,413,125 | Walbridge | Dec. 24, 1946 |